(12) United States Patent
Kim et al.

(10) Patent No.: US 9,854,571 B2
(45) Date of Patent: Dec. 26, 2017

(54) METHOD AND APPARATUS FOR ACQUIRING DIVERSITY GAIN ACCORDING TO DISTRIBUTED RESOURCE ALLOCATION FOR DOWNLINK CONTROL CHANNEL IN WIRELESS COMMUNICATION SYSTEM

(71) Applicant: LG ELECTRONICS INC., Seoul (KR)

(72) Inventors: Myoungseob Kim, Anyang-si (KR); Hanbyul Seo, Anyang-si (KR); Hyukjin Chae, Anyang-si (KR); Inkwon Seo, Anyang-si (KR); Seungmin Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 35 days.

(21) Appl. No.: 14/405,343

(22) PCT Filed: Jan. 14, 2013

(86) PCT No.: PCT/KR2013/000277
§ 371 (c)(1),
(2) Date: Dec. 3, 2014

(87) PCT Pub. No.: WO2014/017716
PCT Pub. Date: Jan. 30, 2014

(65) Prior Publication Data
US 2015/0181569 A1   Jun. 25, 2015

Related U.S. Application Data

(60) Provisional application No. 61/674,847, filed on Jul. 23, 2012, provisional application No. 61/712,216, filed on Oct. 10, 2012.

(51) Int. Cl.
*H04W 72/04* (2009.01)
*H04B 7/02* (2017.01)
(Continued)

(52) U.S. Cl.
CPC ............ *H04W 72/042* (2013.01); *H04B 7/02* (2013.01); *H04B 7/0413* (2013.01); *H04L 5/0053* (2013.01); *H04L 5/0023* (2013.01)

(58) Field of Classification Search
None
See application file for complete search history.

(56) References Cited

U.S. PATENT DOCUMENTS

2010/0118800 A1* 5/2010 Kim .................. H04L 1/0071
                                                      370/329
2010/0135242 A1* 6/2010 Nam ................. H04L 5/0007
                                                      370/330

(Continued)

FOREIGN PATENT DOCUMENTS

KR    10-2009-0034263 A    4/2009
KR    10-2010-0051529 A    5/2010

(Continued)

*Primary Examiner* — Andrew Oh
(74) *Attorney, Agent, or Firm* — Birch, Stewart, Kolasch & Birch, LLP

(57) ABSTRACT

In the present invention, disclosed is a method for a base station transmitting a downlink control channel to user equipment in a wireless communication system. More specifically, the method comprises the steps of configuring resource elements, which are included in each of a plurality of resource blocks, as a plurality of resource element groups comprising a predetermined number of resource elements; allocating antenna ports to the resource elements which are included in each of the plurality of resource element groups; allocating as a transmission resource for the downlink control channel, at least one resource element group from (Continued)

each of the plurality of resource blocks; and transmitting the downlink control channel to the user equipment by using the transmission resource.

12 Claims, 15 Drawing Sheets

(51) Int. Cl.
  *H04B 7/0413* (2017.01)
  *H04L 5/00* (2006.01)

(56) References Cited

U.S. PATENT DOCUMENTS

| | | | | |
|---|---|---|---|---|
| 2010/0238877 | A1* | 9/2010 | Nam | H04L 5/0048 370/329 |
| 2010/0322179 | A1* | 12/2010 | Yu | H04L 5/0048 370/329 |
| 2011/0135308 | A1 | 6/2011 | Tarlazzi et al. | |
| 2011/0274205 | A1 | 11/2011 | Lee et al. | |
| 2011/0292825 | A1 | 12/2011 | Lee et al. | |
| 2012/0033643 | A1 | 2/2012 | Noh et al. | |
| 2012/0108254 | A1* | 5/2012 | Kwon | H04L 5/0023 455/450 |
| 2012/0120905 | A1* | 5/2012 | Ko | H04B 7/0413 370/329 |
| 2012/0201187 | A1* | 8/2012 | Koo | H04L 1/0027 370/312 |
| 2012/0207237 | A1* | 8/2012 | Kwak | H04L 5/0048 375/267 |
| 2012/0263143 | A1 | 10/2012 | Han et al. | |
| 2013/0136100 | A1* | 5/2013 | Yoon | H04W 72/0446 370/330 |
| 2014/0071933 | A1* | 3/2014 | Lee | H04W 52/04 370/329 |
| 2014/0080501 | A1* | 3/2014 | Lee | H04W 72/0453 455/454 |
| 2014/0105155 | A1* | 4/2014 | Kim | H04L 1/1861 370/329 |
| 2014/0247775 | A1* | 9/2014 | Frenne | H04L 5/0048 370/329 |
| 2015/0085773 | A1* | 3/2015 | Seo | H04W 72/042 370/329 |
| 2015/0229455 | A1* | 8/2015 | Seo | H04L 1/1861 370/329 |
| 2015/0230213 | A1* | 8/2015 | Kim | H04L 27/2626 370/329 |

FOREIGN PATENT DOCUMENTS

KR  10-2010-0088518 A  8/2010
KR  10-2010-0091095 A  8/2010

* cited by examiner (a) Control - Plane Protocol Stack (b) User - Plane Protocol Stack (a) 1TX or 2TX (b) 4 TX (a) imbalance RE            (b) balanced RE

FIG. 14

METHOD AND APPARATUS FOR ACQUIRING DIVERSITY GAIN ACCORDING TO DISTRIBUTED RESOURCE ALLOCATION FOR DOWNLINK CONTROL CHANNEL IN WIRELESS COMMUNICATION SYSTEM

CROSS REFERENCE TO RELATED APPLICATIONS

This application is the National Phase of PCT International Application No. PCT/KR2013/000277, filed on Jan. 14, 2013, which claims priority under 35 U.S.C. 119(e) to U.S. Provisional Application No. 61/674,847, filed on Jul. 23, 2012 and 61/712,216, filed on Oct. 10, 2012, all of which are hereby expressly incorporated by reference into the present application.

TECHNICAL FIELD

The present invention relates to a wireless communication system, and more particularly to a method and apparatus for acquiring a diversity gain according to distributed resource allocation for a downlink control channel in a wireless communication system.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE

Technical Problem

An object of the present invention is to provide a method and apparatus for acquiring a diversity gain according to distributed resource allocation for a downlink control channel in a wireless communication system.

Technical Solution

The object of the present invention can be achieved by providing a method for transmitting a downlink control channel to a user equipment (UE) by a base station (BS) in a wireless communication system including: allowing each of resource elements (REs) contained in each of resource blocks (RBs) to be composed of a plurality of resource element (RE) groups each having a predetermined number of resource elements (REs); allocating antenna ports to resource elements (REs) contained in each resource element (RE) group; allocating at least one resource element (RE) group in each of the plurality of resource blocks (RBs) to transmission (Tx) resources for the downlink control channel; and transmitting the downlink control channel to the user equipment (UE) using the transmission (Tx) resources.

The antenna port indexes allocated to respective start resource elements contained in each resource element (RE) group may be cyclically increased or reduced according to indexes of the resource element (RE) groups. The allocating the antenna ports may include: allocating antenna port indexes to the individual resource blocks (RBs) in such a manner that the antenna port indexes are cyclically increased or reduced with respect to all or some of resource elements (REs) contained in the plurality of resource blocks (RBs).

The indexes of resource element (RE) groups allocated to the transmission (Tx) resources may be cyclically increased or reduced according to indexes of the resource blocks (RBs).

If the plurality of resource element (RE) groups allocated to the transmission (Tx) resources is constructed in the same resource block (RB), indexes of the plurality of resource element (RE) groups may be contiguous to each other.

The number of resource elements (REs) contained in the respective resource element (RE) groups may be a constant number. However, the number of resource elements (REs) contained in the respective resource element (RE) groups may be changed according to a reference signal contained in a subframe through which the downlink control channel is transmitted and categories of other downlink control channels.

In accordance with another aspect of the present invention, a base station (BS) device for use in a wireless communication system includes: a processor to allow each of resource elements (REs) contained in each of resource blocks (RBs) to be composed of a plurality of resource element (RE) groups each having a predetermined number of resource elements (REs), to allocate antenna ports to resource elements (REs) contained in each resource element (RE) group, and to allocate at least one resource element (RE) group in each of the plurality of resource blocks (RBs) to transmission (Tx) resources for a downlink control channel; and a wireless communication module to transmit the downlink control channel to the user equipment (UE) using the transmission (Tx) resources.

Advantageous Effects

As is apparent from the above description, the embodiments of the present invention can obtain an additional spatial diversity gain through distributed resource allocation for a downlink control channel.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 14 illustrates E-REG grouping and an antenna port index allocation method based on the E-REG grouping.

BEST MODE

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

Figure 1:
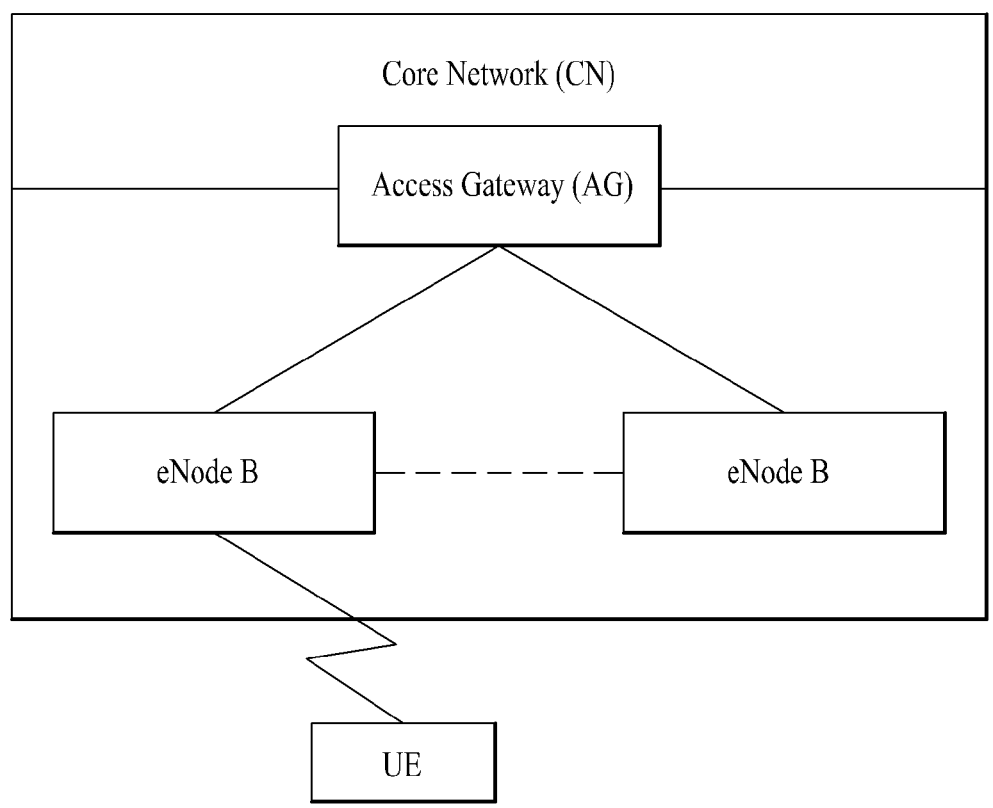
FIG. 1 is a schematic diagram of E-UMTS network structure as one example of a wireless communication system.
Figure 2:
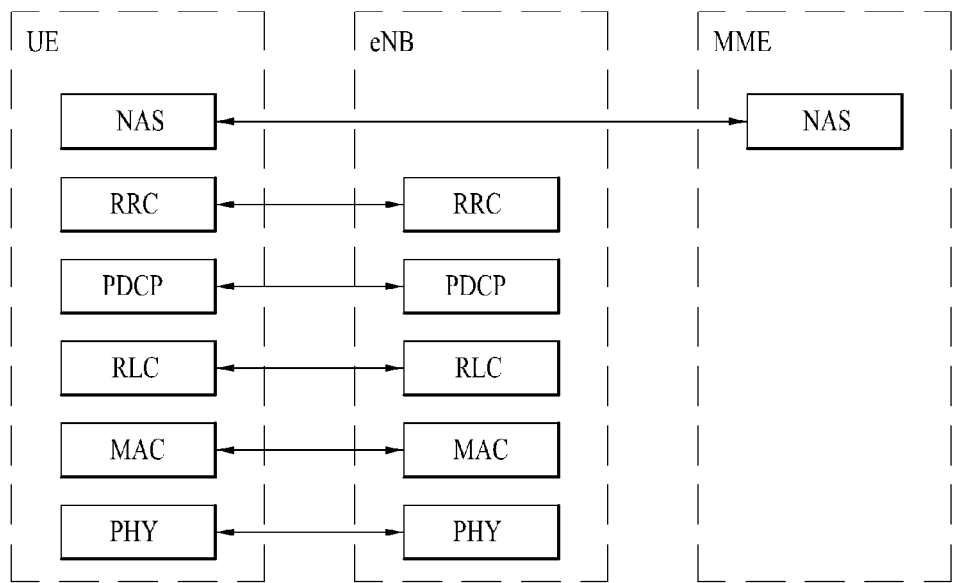
FIG. 2 is a diagram for structures of control and user planes of radio interface protocol between a 3GPP radio access network standard-based user equipment and E-UTRAN.
Figure 2:
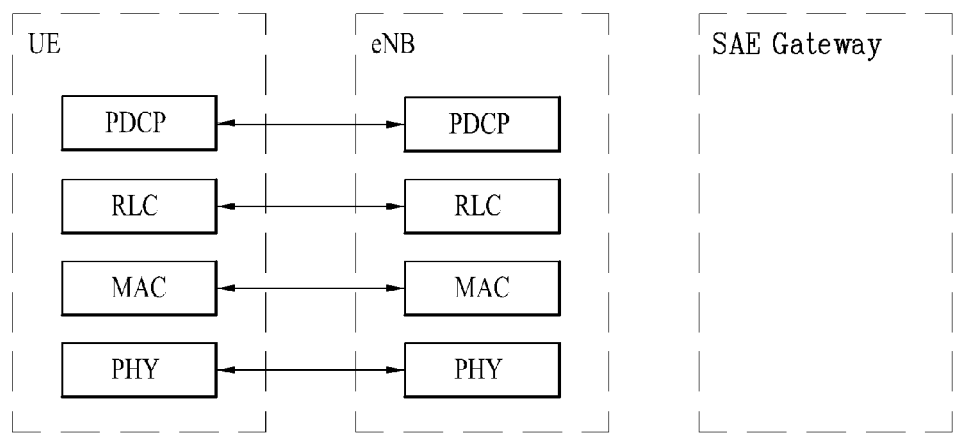

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a 1 st layer, provides higher layers with an information transfer service using a physical channel. The physical layer is connected to a medium access control layer situated above via a transport channel (trans antenna port channel). Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a 2nd layer provides a service to a radio link control (hereinafter abbreviated RLC) layer, which is a higher layer, on a logical channel. The RLC layer of the 2nd layer supports a reliable data transmission. The function of the RLC layer may be implemented by a function block within the MAC. PDCP (packet data convergence protocol) layer of the 2nd layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a 3rd layer is defined on a control plane only. The RRC layer is responsible for control of logical channels, transport channels and physical channels in association with a configuration, a re-configuration and a release of radio bearers (hereinafter abbreviated RBs). The RB indicates a service provided by the 2nd layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B (eNB) is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
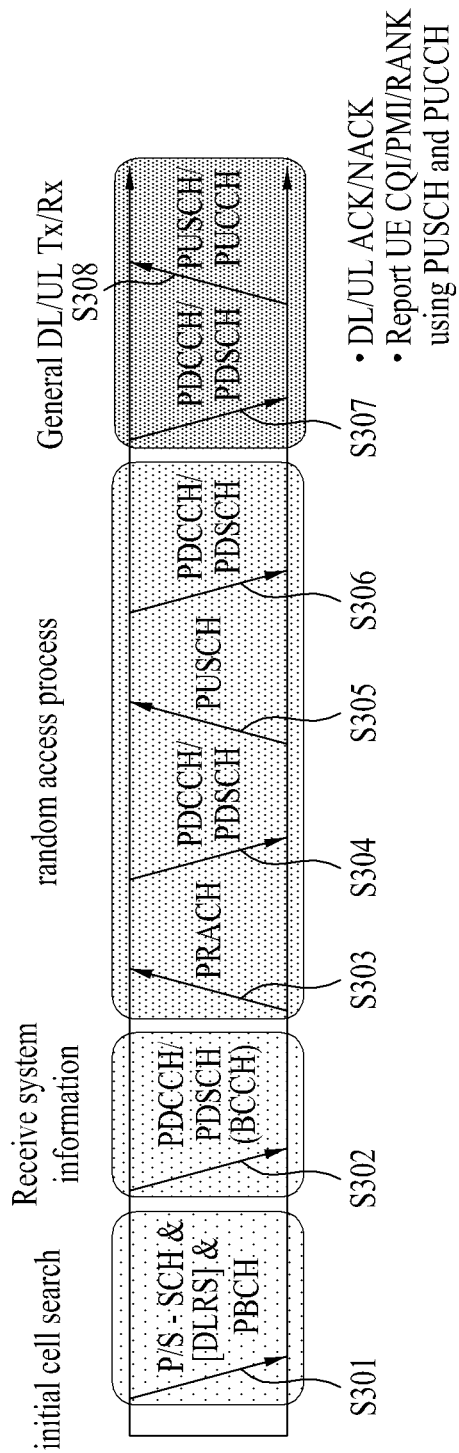
FIG. 3 is a diagram for explaining physical channels used for 3GPP system and a general signal transmission method using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

In the following description, MIMO system is explained. The MIMO (multiple-input multiple-output) is a method using a plurality of transmitting antennas and a plurality of receiving antennas. The efficiency in transmitting and receiving data may be enhanced by the MIMO. In particular, by using a plurality of the antennas at a transmitting end or a receiving end in a radio communication system, it may be able to increase a capacity and enhance performance. In the following description, the MIMO may be called a 'multi-antenna'.

In the multiple antenna technology, it may not depend on a single antenna path to receive a whole message. Data is completed in a manner of combining data fragments received from many antennas in one place in the multiple antenna technology instead. When the multiple antenna technology is used, a data transmission speed may be enhanced in a cell area having a specific size or a system coverage may be enlarged while a specific data transmission speed is secured. And, this technology is widely used in a mobile communication terminal, a relay station, and the like. According to the multiple antenna technology, a throughput limitation of a single antenna used by a conventional technology in a mobile communication can be overcome.

Figure 4:
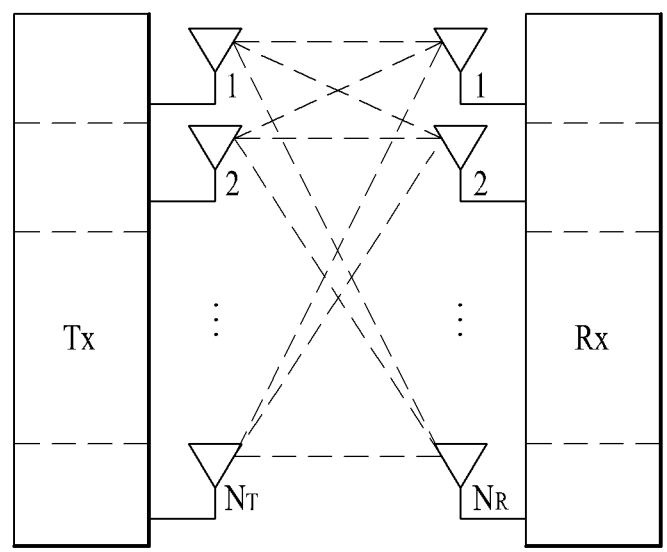
FIG. 4 is a diagram for a configuration of a multiple antenna communication system.

A block diagram of a general multi-antenna communication system is depicted in FIG. 4. $N_T$ number of transmitting antenna is installed in a transmitting end and $N_R$ number of receiving antenna is installed in a receiving end. As described in the above, in case that both the transmitting end and the receiving end use plural number of antennas, a theoretical channel transmission capacity is increased compared to a case that the plural number of antennas are only used for either the transmitting end or the receiving end. The increase of the channel transmission capacity is proportional to the number of antenna. Thus, a transfer rate is enhanced and frequency efficiency is enhanced. If a maximum transfer rate is represented as $R_o$ in case of using a single antenna, the transfer rate using multiple antennas can be theoretically increased as much as the maximum transfer rate Ro multiplied by a rate of increase $R_i$, as shown in the following Formula 1. In this case, the $R_i$ is a smaller value among the $N_T$ and the $N_R$.

$$R_i = \min(N_T, N_R) \qquad \text{[Formula 1]}$$

For instance, MIMO communication system using 4 transmitting antennas and 4 receiving antennas may be able to theoretically obtain the transfer rate of 4 times of a single antenna system. After the theoretical capacity increase of the multi-antenna system is proved in the mid-90s, various technologies for practically enhancing a data transmission rate have been actively studied up to date and several technologies among them are already reflected in such a various wireless communication standard as a 3rd generation mobile communication, a next generation wireless LAN and the like.

If we look at the research trend related to the multi-antenna so far, many active researches have been performed for such a study of various points of view as a study on information theory related to a multi-antenna communication capacity calculation in various channel environments and multiple access environment, a study on a radio channel measurement and model deduction of the multi-antenna system, a study on a space-time signal processing technology for enhancing a transmission reliability and a transmission rate, and the like.

Figure 7:
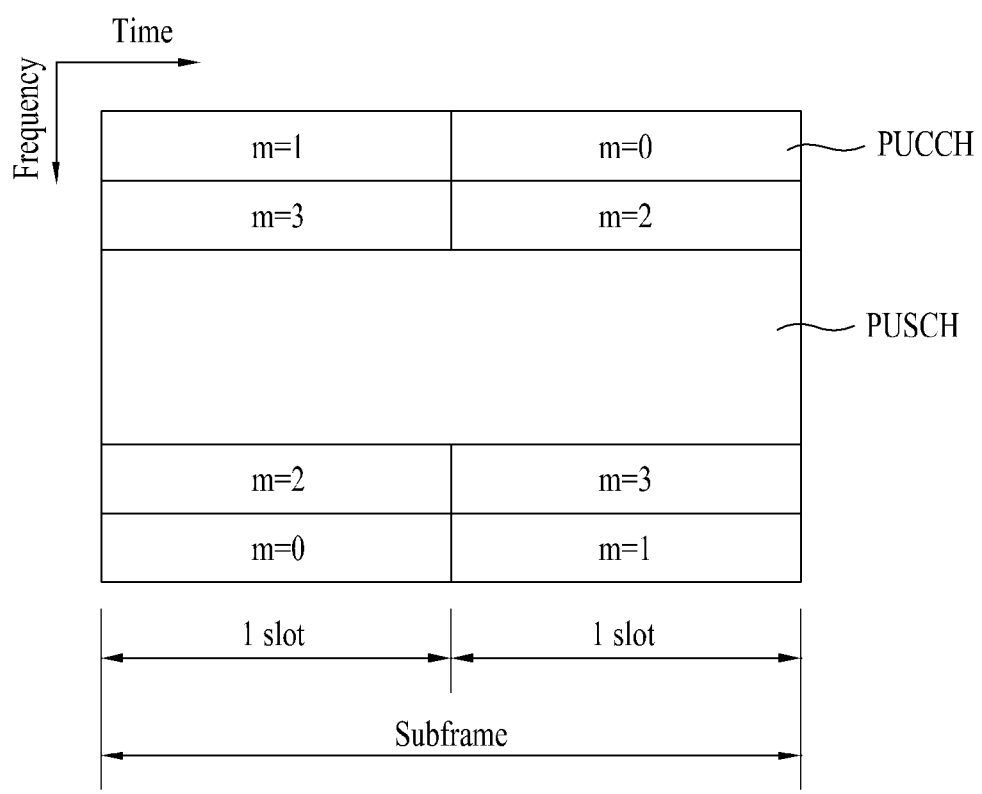
FIG. 7 is a diagram for a structure of an uplink radio frame in LTE system.

In case of mathematically modeling a communication method of the multi-antenna system in order to explain it with more specific way, it can be represented as follows. As shown in FIG. 7, assume that there exist $N_T$ number of transmitting antenna and $N_R$ number of receiving antenna. First of all, if we look into a transmission signal, since the maximum number of information capable of being transmitted is $N_T$ in case that there exists $N_T$ number of transmitting antenna, transmission information can be represented as a vector in the following Formula 2.

$$s = [s_1, s_2, \ldots, s_{N_T}]^T \qquad \text{[Formula 2]}$$

Meanwhile, for each of the transmission informations $s_1$, $s_2$, ..., $s_{N_T}$, a transmit power may be differentiated according to the each of the transmission informations. In this case, if each of the transmit powers is represented as $P_1$, $P_2$, ..., $P_{N_T}$, transmit power-adjusted transmission information can be represented as a vector in the following Formula 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Formula 3]}$$

And, if $\hat{s}$ is represented using a diagonal matrix P, it can be represented as a following Formula 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Formula 4]}$$

Meanwhile, let's consider a case that the NT number of transmission signal $x_1, x_2, \ldots, x_{N_T}$, which is practically transmitted, is configured in a manner of applying a weighted matrix W to the adjusted information vector $\hat{s}$. In this case, the weighted matrix performs a role of distributing the transmission information to each of the antennas according to the situation of the transmission channel and the like. The transmission signal $x_1, x_2, \ldots, x_{N_T}$, can be represented using a vector X in the following Formula 5. In this case, $W_{ij}$ means a weighting between an ith transmitting antenna and $j^{th}$ information. The W is called the weighted matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Formula 5]}$$

In general, a physical meaning of a rank of a channel matrix may indicate a maximum number capable of transmitting different information from each other in a given channel. Hence, since the rank of the channel matrix is defined by a minimum number of the numbers of row or column independent from each other, the rank of the matrix is configured not to be greater than the number of the row or the column. For instance, the rank of a channel matrix H (rank (H)) is limited as shown in Formula 6.

$$\text{rank}(H) \leq \min(N_T, N_R) \qquad \text{[Formula 6]}$$

And, let's define each of the informations different from each other, which are transmitted using a multi-antenna technology, as a transport stream or simply a stream. The stream can be named a layer. Then, the number of the transport stream is naturally configured not to be greater than the rank of the channel, which is a maximum number capable of transmitting informations different from each other. Hence, the channel matrix H can be represented as Formula 7 in the following.

$$\text{\# of streams} \leq \text{rank}(H) \leq \min(N_T, N_R) \qquad \text{[Formula 7]}$$

In this case, '# of streams' indicates the number of streams. Meanwhile, in this case, it should be cautious that one stream can be transmitted via more than one antenna.

Various methods making one or more streams correspond to many antennas may exist. These methods can be described in accordance with the kind of the multi-antenna technology in the following description. A case of transmitting one stream via many antennas may be called a space diversity scheme and a case of transmitting many streams via many antennas may be called a space multiplexing scheme. Of course, a hybrid form of the space diversity and the space multiplexing is also available.

Figure 5:
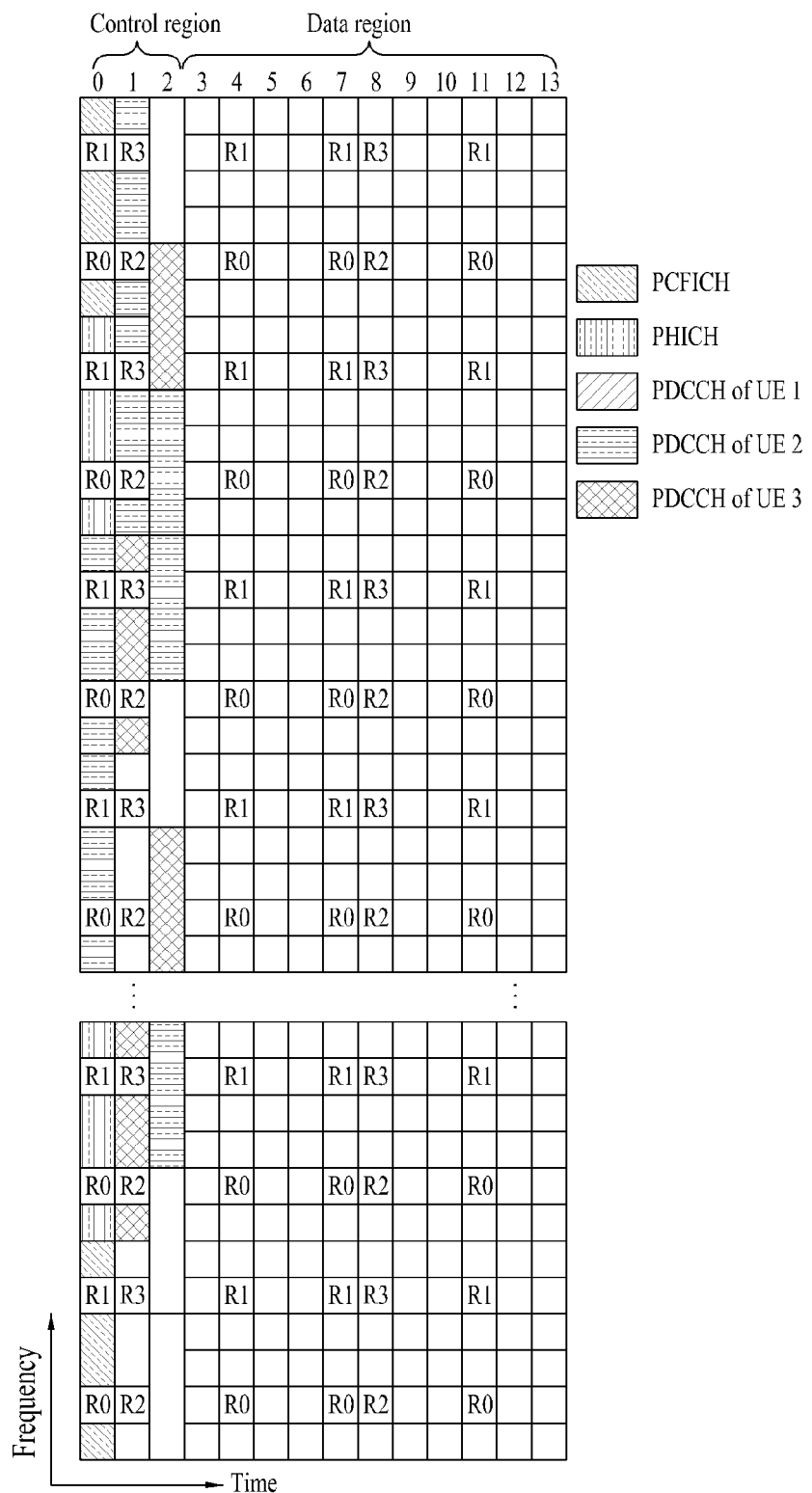
FIG. 5 is a diagram for a structure of a downlink radio frame in LTE system.

FIG. 5 is a diagram for showing an example of a control channel included in a control region of a single subframe in a DL radio frame. The number of OFDM symbols included in a single subframe varies according to a space between a length of a cyclic prefix (CP) (i.e., a normal CP or an extended CP) and a subcarrier. In the following description, assume that a space between a normal CP and a subcarrier corresponds to 15 kHz.

Referring to FIG. 5, a subframe consists of 14 OFDM symbols. According to a subframe configuration, the first 1 to 3 OFDM symbols are used for a control region and the other 13~11 OFDM symbols are used for a data region. In FIG. 5, R1 to R4 may indicate a reference signal (RS) or a pilot signal for an antenna 0 to 3. The RS is fixed as a constant pattern in the subframe irrespective of the control region and the data region. The control channel is assigned to a resource to which the RS is not assigned in the control region and a traffic channel is also assigned to a resource to which the RS is not assigned in the data region. The control channel assigned to the control region may include a physical control format indicator channel (PCFICH), a physical hybrid-ARQ indicator channel (PHICH), a physical downlink control channel (PDCCH), and the like.

The PCFICH (physical control format indicator channel) informs a user equipment of the number of OFDM symbols used for the PDCCH on every subframe. The PCFICH is situated at the first OFDM symbol and is configured prior to the PHICH and the PDCCH. The PCFICH consists of 4 resource element groups (REG) and each of the REGs is distributed in the control region based on a cell ID (cell identity). One REG consists of 4 resource elements (RE). The RE may indicate a minimum physical resource defined as 'one subcarrier×one OFDM symbol'. The value of the PCFICH may indicate the value of 1 to 3 or 2 to 4 according to a bandwidth and is modulated into a QPSK (quadrature phase shift keying).

The PHICH (physical HARQ (hybrid-automatic repeat and request) indicator channel) is used for carrying HARQ ACK/NACK for an UL transmission. In particular, the PHICH indicates a channel to which DL ACK/NACK information is transmitted for UL HARQ. The PHICH consists of a single REG and is scrambled cell-specifically. The ACK/NACK is indicated by 1 bit and modulated into BPSK (binary phase shift keying). The modulated ACK/NACK is spread into a spread factor (SF) 2 or 4. A plurality of PHICHs, which are mapped to a same resource, composes a PHICH group. The number of PHICH, which is multiplexed by the PHICH group, is determined according to the number of spreading code. The PHICH (group) is repeated three times to obtain diversity gain in a frequency domain and/or a time domain.

The PDCCH (physical DL control channel) is assigned to the first n OFDM symbol of a subframe. In this case, the n is an integer more than 1 and indicated by the PCFICH. The PDCCH consists of at least one CCE. The PDCCH informs each of user equipments or a user equipment group of an information on a resource assignment of PCH (paging channel) and DL-SCH (downlink-shared channel), which are transmission channels, an uplink scheduling grant, HARQ information and the like. The PCH (paging channel) and the DL-SCH (downlink-shared channel) are transmitted on the PDSCH. Hence, an eNode B and the user equipment transmit and receive data via the PDSCH in general except a specific control information or a specific service data.

Information on a user equipment (one or a plurality of user equipments) receiving data of PDSCH, a method of receiving and decoding the PDSCH data performed by the user equipment, and the like is transmitted in a manner of being included in the PDCCH. For instance, assume that a specific PDCCH is CRC masked with an RNTI (radio network temporary identity) called "A" and an information on data transmitted using a radio resource (e.g., frequency position) called "B" and a DCI format i.e., a transmission form information (e.g., a transport block size, a modulation scheme, coding information, and the like) called "C" is transmitted via a specific subframe. In this case, the user equipment in a cell monitors the PDCCH using the RNTI information of its own, if there exist at least one or more user equipments having the "A" RNTI, the user equipments receive the PDCCH and the PDSCH, which is indicated by the "B" and the "C", via the received information on the PDCCH.

Figure 6:
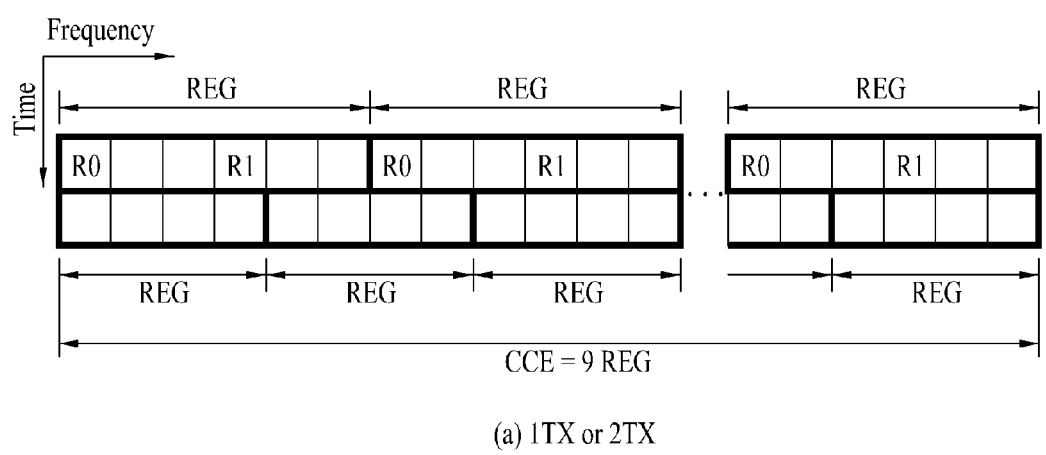
FIG. 6 is a diagram of a resource unit used for constructing a control channel.
Figure 6:
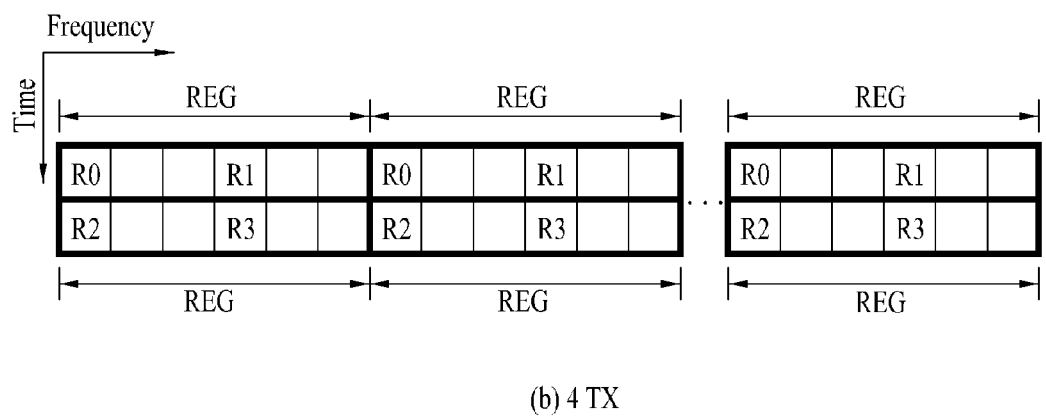

FIG. 6 is a diagram of a resource unit used for constructing a downlink control channel in LTE system. In particular, FIG. 6 (a) indicates a case that the number of transmitting antennas of an eNode B corresponds to 1 or 2 and FIG. 6 (b) indicates a case that the number of transmitting antennas of the eNode B corresponds to 4. A reference signal (RS) pattern varies according to the number of transmitting antennas but a method of configuring a resource unit in relation to a control channel is identical irrespective of the number of transmitting antennas.

Referring to FIG. 6, a base resource unit of a downlink control channel is a REG (resource element group). The REG consists of 4 neighboring resource elements except an RS. The REG is represented in the drawing with a bold line. The PCFICH and the PHICH include 4 REGs and 3 REGs, respectively. The PDCCH consists of a CCE (control channel element) unit and one CCE includes 9 REGs.

In order for a UE to check whether the PDCCH consisting of L number of CCEs is transmitted to the UE, the UE is configured to check the CCEs contiguously arranged by $M^{(L)}$ ($\geq L$) number of CCEs or a specific rule. A value of the L, which should be considered for the UE to receive the PDCCH, may become a plural number. The UE should check CCE aggregations to receive the PDCCH. The CCE aggregations are called a search space. As an example, the search space is defined by LTE system as Table 1 in the following.

TABLE 1

| Search space $S_k^{(L)}$ | | | Number of | |
|---|---|---|---|---|
| Type | Aggregation level L | Size [in CCEs] | PDCCH candidates $M^{(L)}$ | DCI formats |
| UE-specific | 1 | 6 | 6 | 0, 1, 1A, 2B, 1D, 2, 2A, 2B, 4 |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

In this case, CCE aggregation level L indicates the number of CCE consisting of PDCCH, $s_k^{(L)}$ indicates a search space of the CCE aggregation level L and $M^{(L)}$ indicates the number of candidate PDCCHs monitored in the search space of the aggregation level L.

The search space can be classified into a UE-specific search space accessible by a specific UE only and a common search space accessible by all UEs in a cell. A UE monitors the common search space of which the CCE aggregation level corresponds to 4 and 8 and monitors the UE-specific search space of which the CCE aggregation level corresponds to 1, 2, 4, and 8. The common search space and the UE-specific search space may overlap with each other.

And, a position of a first (having a smallest index) CCE in a PDCCH search space, which is given to a random UE for each CCE aggregation level value, varies in every subframe depending on a user equipment. This is called a PDCCH search space hashing.

The CCE can be distributed to a system band. More specifically, a plurality of CCEs, which are logically contiguous, can be inputted to an interleaver. The interleaver performs a function of mixing a plurality of the CCEs with each other in REG unit. Hence, frequency/time resources forming a CCE are physically distributed in the total frequency/time domain within a control region of a subframe. Consequently, although a control channel is constructed in a CCE unit, the interleaving is performed in an REG unit. Hence, frequency diversity and interference randomization gain can be maximized.

FIG. 7 is a diagram for a structure of an uplink subframe used in LTE system.

Referring to FIG. 7, an UL subframe can be divided into a region to which a physical uplink control channel (PUCCH) carrying control information is assigned and a region to which a physical uplink shared channel (PUSCH) carrying a user data is assigned. A middle part of the subframe is assigned to the PUSCH and both sides of a data region are assigned to the PUCCH in a frequency domain. The control information transmitted on the PUCCH includes an ACK/NACK used for HARQ, a CQI (channel quality indicator) indicating a DL channel status, an RI (rank indicator) for MIMO, an SR (scheduling request) corresponding to an UL resource allocation request, and the like. The PUCCH for a single UE uses one resource block, which occupies a frequency different from each other in each slot within a subframe. In particular, 2 resource blocks assigned to the PUCCH are frequency hopped on a slot boundary. In particular, FIG. 7 shows an example that the PUCCHs satisfying conditions (e.g., m=0, 1, 2, 3) are assigned to a subframe.

Meanwhile, as various devices requiring M2M (machine-to-machine) communication and high data transmission capacity are emerged and disseminated, data requisites for a cellular network are rapidly increasing in a current wireless communication environment. In order to satisfy high data requisite, communication technologies are developing to a carrier aggregation technology for efficiently using more frequency bands, a multi-antenna technology used for increasing data capacity in a limited frequency, a multi-base station cooperation technology, and the like and the communication environment is evolving in a manner that density of an accessible node is growing in the vicinity of a user. A system equipped with the node of high density may have higher system performance by means of cooperation between nodes. Compared to a node operating as an independent base station (a base station (BS), an advanced BS (ABS), a Node-B (NB), an eNode-B (eNB), an access point (AP), and the like) without cooperation, the aforementioned scheme may have superior performance.

Figure 8:
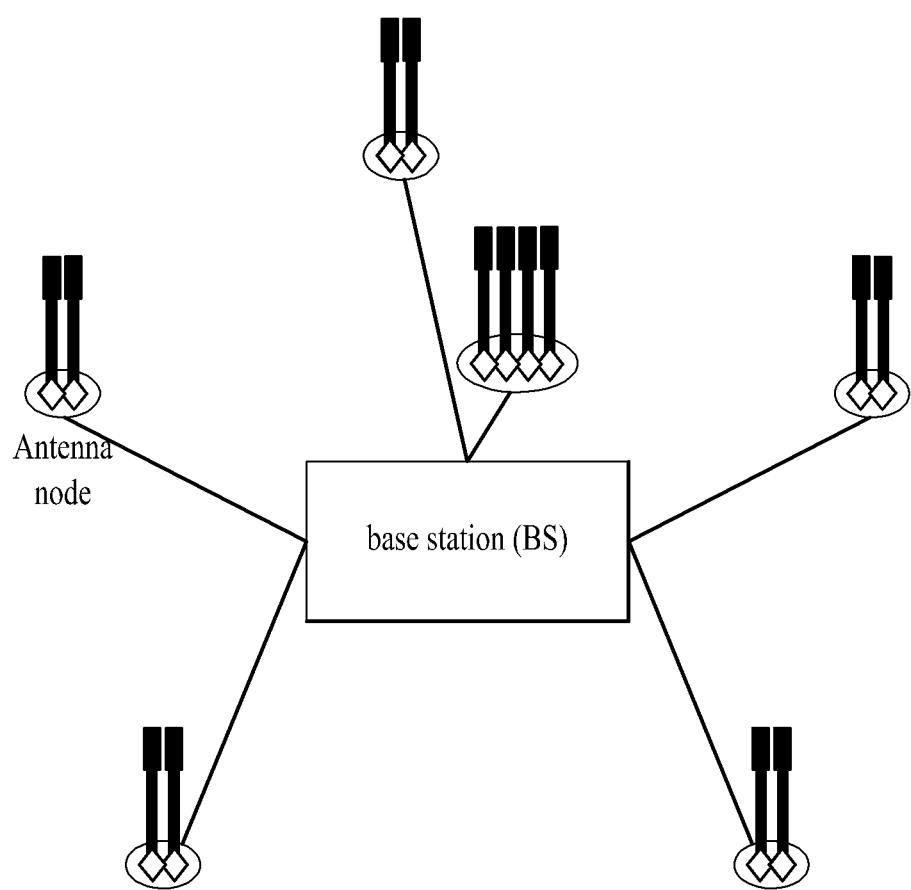
FIG. 8 is a diagram for an example of a multi node system in a next generation communication system.

FIG. 8 is a diagram for an example of a multi node system in a next generation communication system.

Referring to FIG. 8, if an individual node operates as a part of antenna group of a cell in a manner that a controller manages transmission and reception of all nodes, it may correspond to a distributed multi node system (DMNS) that forms a single cell. In this case, each of the individual nodes may receive a separate node ID or may operate as a part of antenna within the cell without a separate Node ID. Yet, if nodes have a cell identifier (ID) different from each other, it may correspond to a multi-cell system. If a multi cell is configured by a duplicated form according to coverage, this is called a multi-tier network.

Meanwhile, a Node-B, an eNode-B, a PeNB, a HeNB, an RRH (remote radio head), a relay, a distributed antenna, and the like may become a node and at least one antenna is installed in a node. A node is also called a transmission point. In general, a node indicates an antenna group apart from each other more than a prescribed space, the present invention defines and applies a node as a random antenna group irrespective of a space.

With the help of the introduction of the aforementioned multi-node system and a relay node, application of various communication schemes is enabled and channel quality enhancement can be performed. Yet, in order to apply the aforementioned MIMO scheme and inter-cell cooperation communication scheme to a multi-node environment, an introduction of a new control channel is required. To this end, a control channel considered as the newly introduced control channel, which corresponds to an E-PDCCH (enhanced-PDCCH), is under discussion. This channel is determined to be assigned to a data region (hereinafter described as PDSCH region) instead of a legacy control region (hereinafter described as PDCCH region). Consequently, control information on a node can be transmitted according to each UE via the E-PDCCH. Hence, a problem of shortage of the legacy PDCCH region can be solved as well. For reference, the E-PDCCH is not provided to a legacy UE. Instead, an LTE-A UE can receive the E-PDCCH only. And, transmission/reception of the E-PDCCH is performed based on a DM-RS (or CSI-RS) instead of a CRS corresponding to a legacy cell-specific reference signal.

Figure 9:
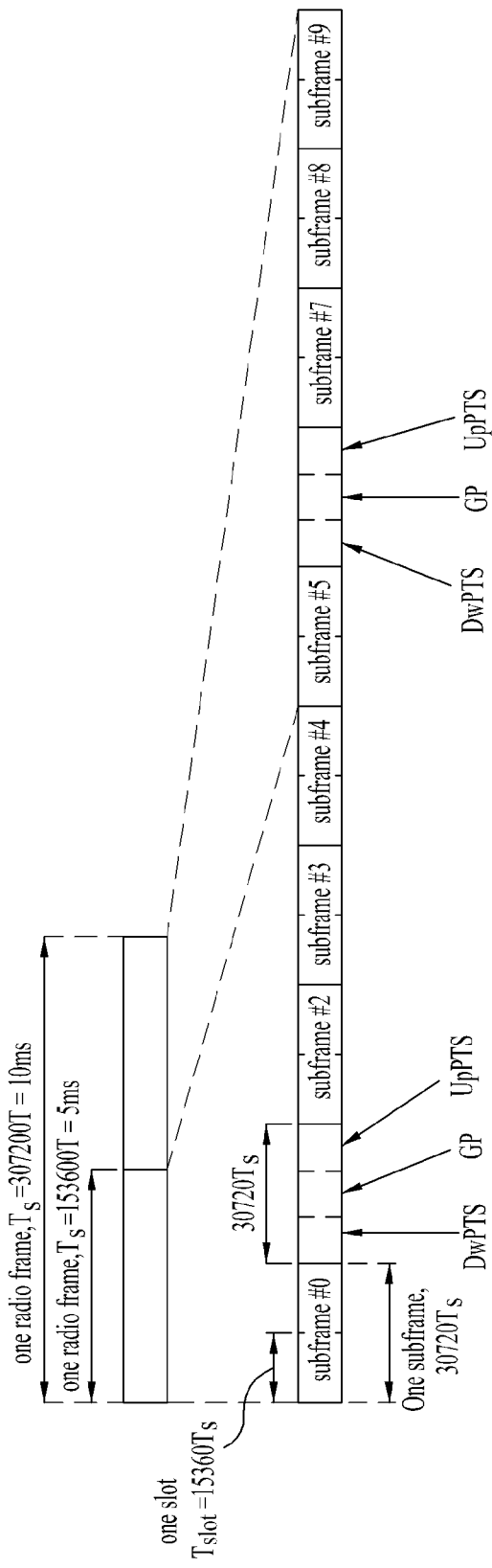
FIG. 9 is a diagram for an example of a structure of a radio frame in LTE TDD system.

FIG. 9 is a diagram for an example of a structure of a radio frame in LTE TDD system. In LTE TDD system, a radio frame includes two half frames. Each of the half frames includes 4 normal subframes including 2 slots, respectively and a special subframe including DwPTS (downlink pilot time slot), GP (guard period) and UpPTS (uplink pilot time slot).

Among the special subframe, the DwPTS is used for initial cell search in a user equipment, synchronization or channel estimation. The UpPTS is used for channel estimation in a base station and uplink transmission synchronization of the user equipment. In particular, the DwPTS is used for DL transmission and the UpPTS is used for UL transmission. In particular, the UpPTS is utilized to transmit a PRACH preamble or an SRS. The guard period is a period for eliminating interference generated in uplink due to multi-path delay of a downlink signal between uplink and downlink.

Regarding the special subframe, configuration of the special subframe is defined by a current 3GPP standard document as Table 2 in the following. Referring to Table 2, in case of $T_s=1/(15000 \times 2048)$, it indicates the DwPTS and the UpPTS and a remaining region is configured as the guard period.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |

TABLE 2-continued

| | | Normal cyclic prefix in downlink | | | Extended cyclic prefix in downlink | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

In the LTE TDD system, an uplink/downlink (UL/DL) configuration is shown in Table 3 below.

TABLE 3

| Uplink-downlink configuration | Downlink-to-Uplink Switch-point periodicity | Subframe number | | | | | | | | | |
| | | 0 | 1 | 2 | 3 | 4 | 5 | 6 | 7 | 8 | 9 |
| --- | --- | --- | --- | --- | --- | --- | --- | --- | --- | --- | --- |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 3 above, D denotes a downlink subframe, U denotes an uplink subframe and S denotes the special subframe. Table 2 above shows a downlink-to-uplink switch-point periodicity in the UL/DL configuration in each system.

Figure 10:
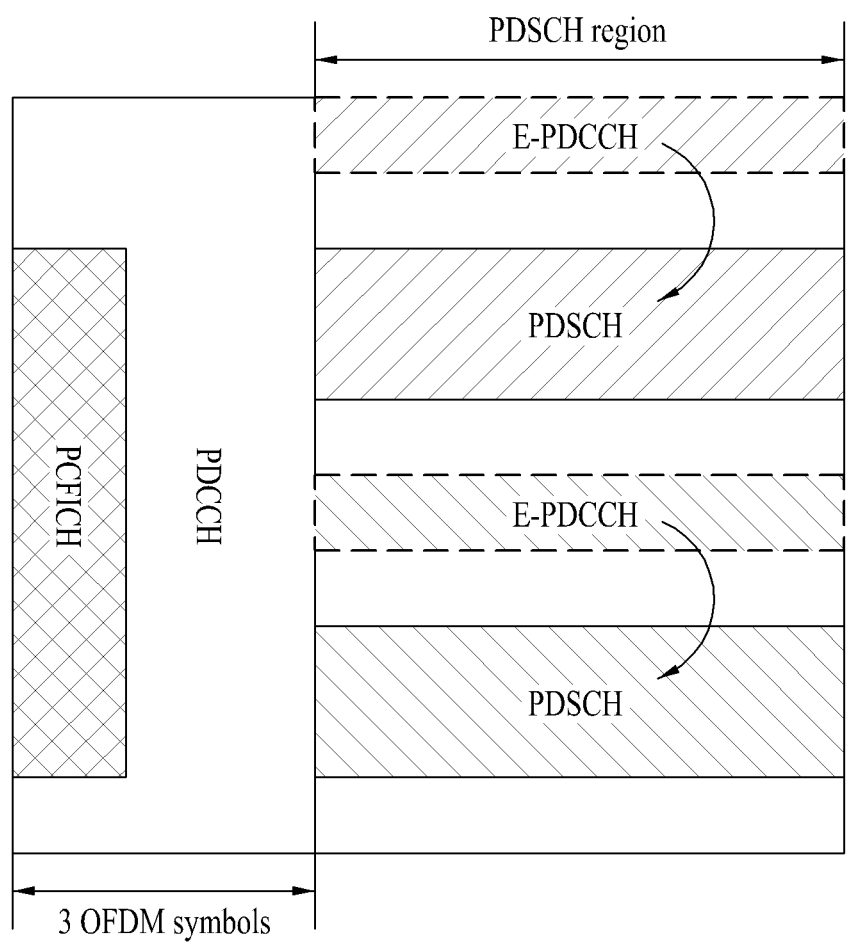
FIG. 10 is a diagram for an example of E-PDCCH and PDSCH scheduled by the E-PDCCH.

FIG. 10 is a diagram for an example of E-PDCCH and PDSCH scheduled by E-PDCCH.

Referring to FIG. 10, E-PDCCH can be transmitted via a PDSCH region, which transmits data in general. A UE should perform a blind decoding on a search space for E-PDCCH to detect presence or non-presence of the E-PDCCH in the UE.

The E-PDCCH performs a scheduling operation (i.e., PDSCH, PUSCH control) identical to that of a legacy PDCCH. Yet, if the number of such a UE accessed a node as an RRH increases, more E-PDCCHs are assigned to the PDSCH region. Hence, the number of blind decoding, which should be performed by the UE, increases and complexity may increase as well.

Meanwhile, E-PDCCH may be distributed and allocated to a plurality of RBs so as to obtain a frequency diversity. In this case, if E-PDCCH is allocated to a larger number of RBs than the number of aggregation levels (i.e., the number of E-CCEs constructing E-PDCCH) of E-PDCCH, one or less CCE may be allocated per RB. In this case, a resource structure composed of a unit (i.e., the number of REs) having the same or smaller size as the size of each E-CCE is needed for each RB. For convenience of description and better understanding of the present invention, the above-mentioned resource structure will hereinafter be referred to as an RE set or an E-REG. In addition, an E-CCE allocated as described above will hereinafter be referred to as a distributed E-CCE.

For example, since E-PDCCH having an aggregation level of 1 may be transmitted through one E-CCE, if one distributed. E-CCE composed of 4 E-REGs is allocated to four RBs, one E-REG is allocated to each RB. In this case, the distributed E-CCE can obtain a frequency diversity order of 4. However, if each E-REG uses a single antenna port, it is impossible to obtain an additional spatial diversity gain within the RB. Therefore, antenna port allocation per RE may be differently established in E-REG in such a manner that the spatial diversity order corresponding to the number of antenna ports capable of being used for E-CCE purposes can be obtained.

In this case, according to the number of REs constructing the E-REG and the number of available antenna ports, the same number of REs may not be allocated to each antenna port within the E-REG. In addition, from the viewpoint of a distributed E-CCE composed of a plurality of E-REGs, as the number of E-REGs constructing the distributed E-CCE increases, RE imbalance between the antenna ports becomes more serious, and spatial diversity may be insufficiently obtained. Therefore, the present invention proposes a method for solving RE imbalance by adjusting an antenna port index to each E-REG.

First of all, the embodiment of the present invention provides a method for alternately allocating antenna ports according to the order of REs contained in E-REG (i.e., according to the RE indexes), and provides a method for differently establishing a start point of antenna port index allocation according to the E-REG indexes.

Figure 11:
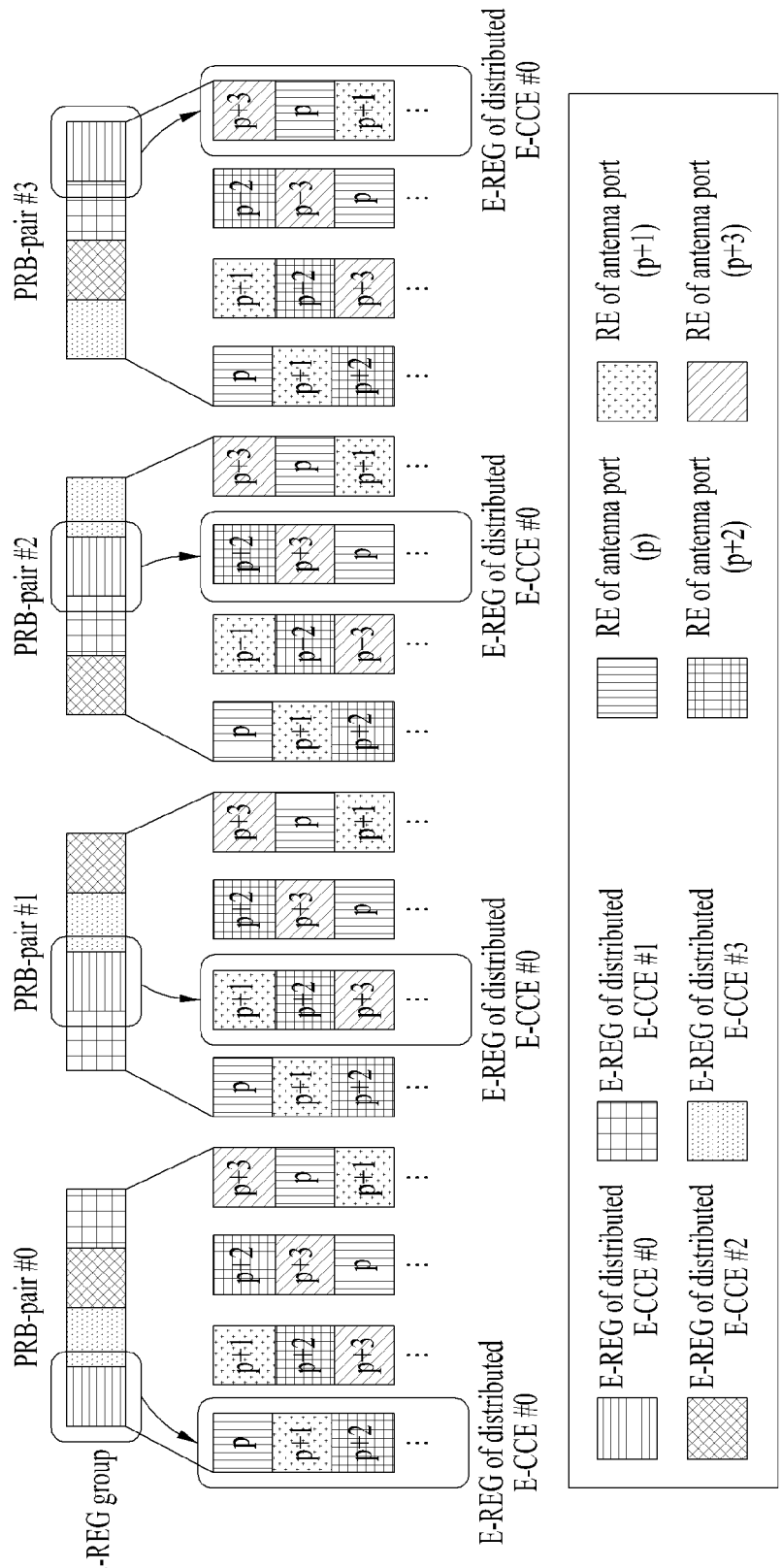
FIG. 11 illustrates an example of allocating an antenna port to each RE of enhanced-resource element group (E-REG) according to an embodiment of the present invention.

FIG. 11 illustrates an example of allocating an antenna port to each RE of E-REG according to an embodiment of the present invention. Specifically, in FIG. 11, it is assumed that k available antenna ports are present, and indexes are sequentially indexed in the range from the p-th antenna port to the (p+k−1)-th antenna port. When 4 E-REGs are present per E-REG group and 4 antenna ports are available for distributed E-CCE, the antenna ports are allocated in different ways according to E-REGs.

Referring to FIG. 11, antenna ports {p, p+1, . . . p+k−1, p, p+1, . . . } are alternately allocated to respective REs of a first E-REG, antenna ports {p+1, p+2, . . . , p+k−1, p, p+1, . . . } are alternately allocated to respective REs of a second E-REG, and antenna ports {p+2, p+3, . . . , p+k−1, p, p+1, . . . } are alternately allocated to respective REs of the next E-REG. The indexes of antenna ports allocated to a first RE of each E-REG can be differently established according to E-REG indexes. Therefore, REs can be evenly allocated to respective antenna ports according to the embodiments of the present invention.

Meanwhile, it is preferable that each E-REG be assigned the same number of REs. However, it should be noted that different numbers of REs may also be assigned to respective E-REGs. In this case, according to the scheme for changing a start point of antenna port index allocation according to the E-REG index, REs may not be evenly allocated to respective antenna ports.

Therefore, indexes may be sequentially allocated from the start point to the end point of the E-REG group irrespective of E-REG indexes. In this case, the defined E-REG group may be a group composed of E-REGs having indexes ($k_0$, $k_1$, ..., $k_{n-1}$) in one resource element (RE) block on the assumption that the E-REGs capable of being assigned to one distributed E-CCE over a plurality of RE blocks have indexes ($k_0$, $k_1$, ..., $k_{n-1}$).

Figure 12:
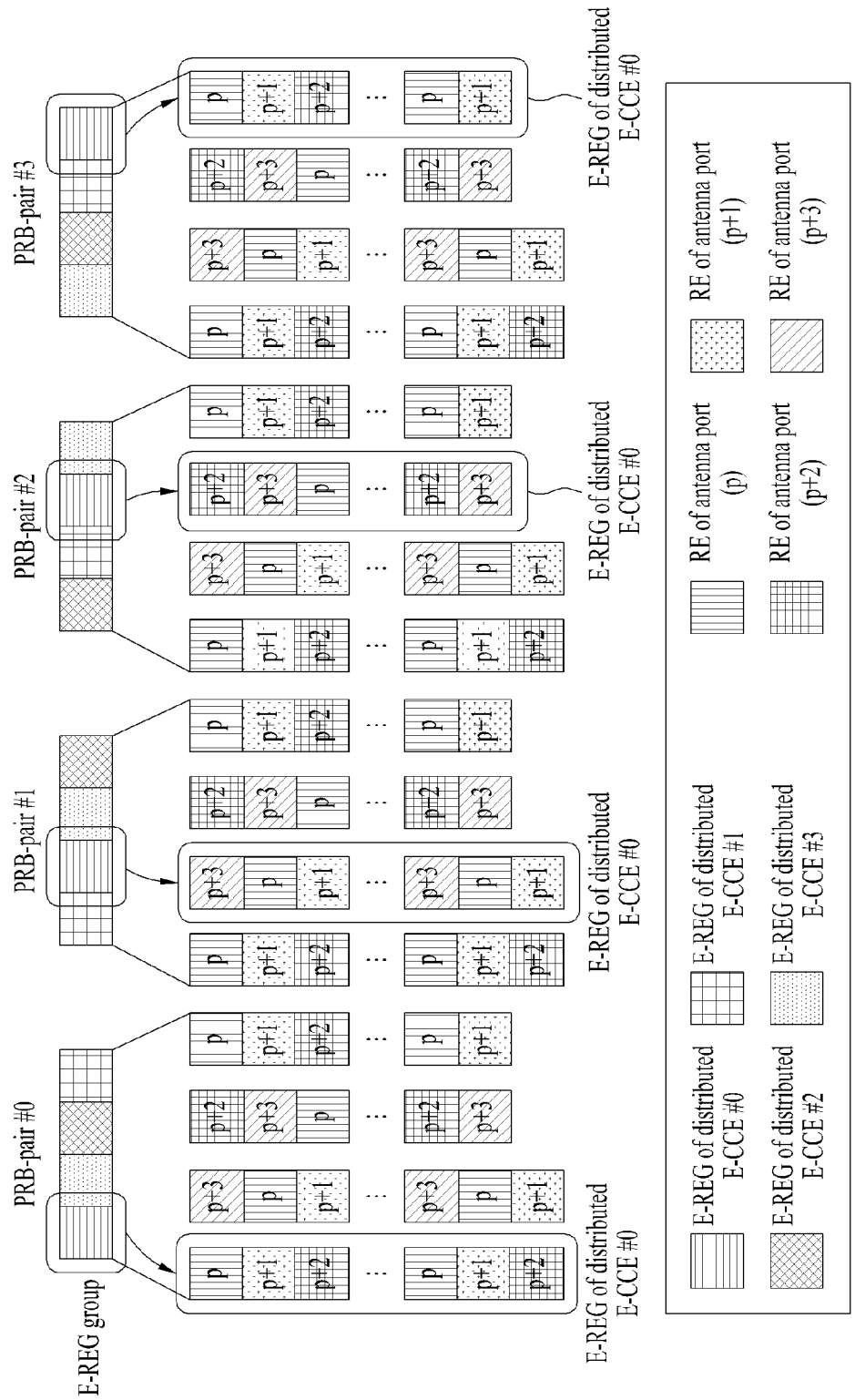
FIG. 12 illustrates an example of allocating an antenna port to each RE of E-REG according to an embodiment of the present invention.

FIG. 12 illustrates an example of allocating an antenna port to each RE of an E-REG according to an embodiment of the present invention.

Referring to FIG. 12, assuming that 4 E-REGs for each E-REG group are present and 4 antenna ports for the distributed E-CCE are available, the antenna ports can be sequentially and alternately allocated in the range from the start point to the end point of the E-REG group. The antenna port indexes are sequentially allocated to all parts of the distributed E-CCE, and REs can be evenly allocated to all antenna ports although imbalanced RE allocation between E-REGs occurs.

FIGS. 11 and 12 show that one E-REG is allocated to each RB so that the distributed E-CCE can be constructed. However, if the E-PDCCH aggregation level is very high or if the number of RBs for the distributed E-CCE is limited, a plurality of E-REGs instead of one E-REG can be allocated to each RB.

Figure 13:
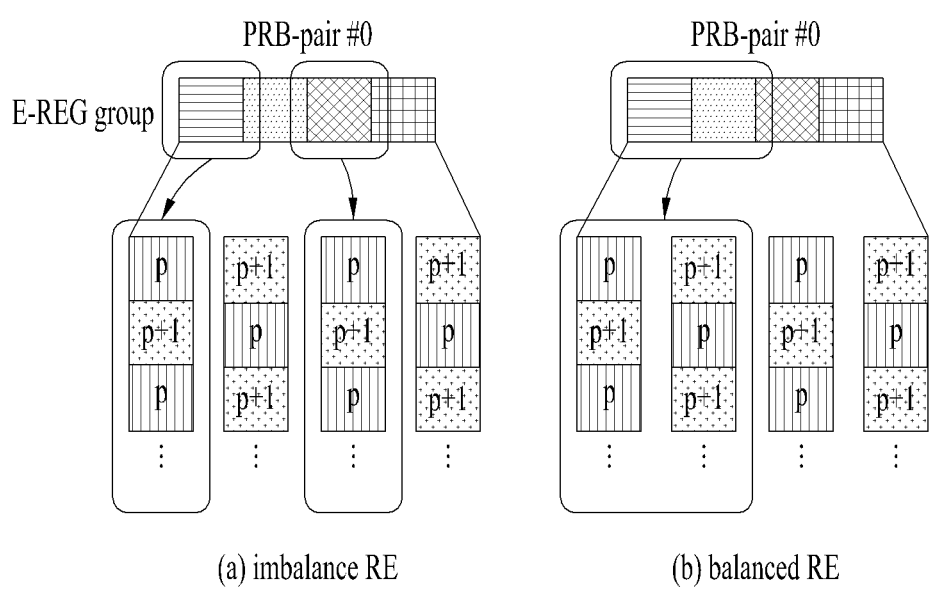
FIG. 13 illustrates an example of allocating a plurality of E-REGs per RB.

FIG. 13 shows an example in which a plurality of E-REGs is allocated to each RB.

Referring to FIG. 13, if E-REGs having the same pattern of antenna port allocation are selected from RBs as shown in FIG. 13(a), RE imbalance between antenna ports may also occur. Therefore, the operation for evenly allocating E-REGs having different patterns of antenna port allocation can address RE imbalance between ports within RB. For example, if contiguous E-REGs have different patterns of antenna port allocation as shown in FIGS. 11 and 12, E-REGs contained in each contiguous E-CCE can be successively allocated as shown in FIG. 13(b).

As described above, the start point of the antenna port index can be differently allocated to respective E-REGs. In this case, E-REGs starting from different antenna port indexes are grouped by a predetermined rule, and can be mapped in a manner that individual groups can start from different antenna port indexes. In more detail, if the antenna port indexes are indexed to the range (p, p+1, ..., p+n−1), and if the spatial diversity having the order (n) is used and N E-REGs are present, E-REGs are grouped into G E-REGs (where G≤N) according to a specific rule, different start points may be assigned to antenna port indexes of each group.

Figure 14:
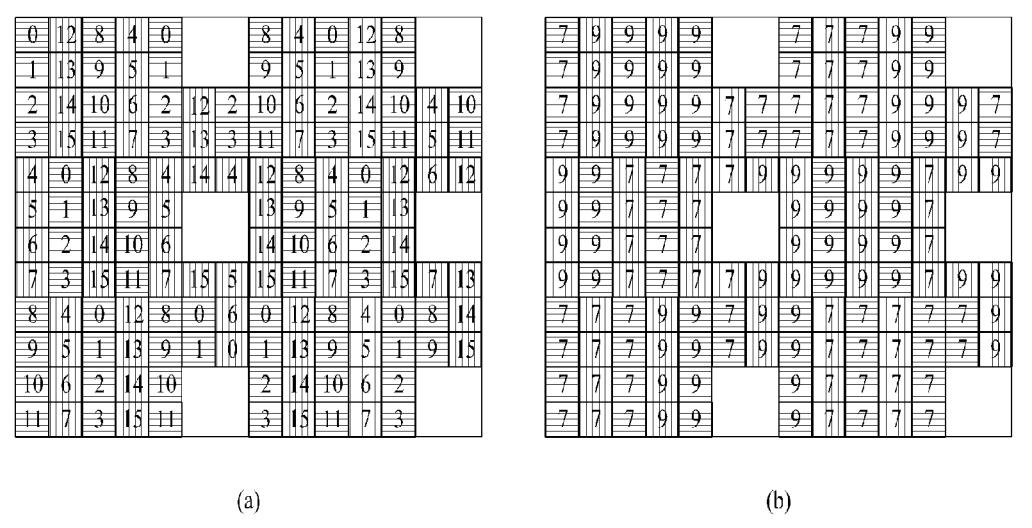

FIG. 14 illustrates E-REG grouping and an antenna port index allocation method based on the E-REG grouping. In more detail, FIG. 14(a) shows that several E-REGs are allocated to one PRB pair, and are classified into two E-REG groups. FIG. 14(b) shows allocation patterns starting from different antenna port indexes allocated to respective E-REG groups.

Specifically, FIG. 14 assumes that the spatial diversity having the order of 2 is used (here, the antenna port indexes are assigned #7 and #9), assumes that 16 E-REGs are present in one PRB pair, and also assumes that 4 E-REGs are assigned to one ECCE.

Referring to FIG. 14(a), E-REG may be classified into two groups, E-REG indexes contained in E-REG Group #1 may be assigned {0, 1, 2, 3, 8, 9, 10, 11}, and E-REG indexes contained in E-REG Group #2 may be assigned {4, 5, 6, 7, 12, 13, 14, 15}. In FIG. 14(a), numerals contained in each RE may indicate indexes of E-REG.

In addition, as can be seen from FIG. 14(b), REs contained in E-REG group #1 may start from the antenna port index #7, and the antenna port indexes are alternately allocated in the order of 7/9/7/9/ . . . . On the other hand, REs contained in E-REG group #2 may start from the antenna port index #9, and the antenna port indexes may be sequentially allocated in the order of 9/7/9/7 . . . . Numerals contained in each RE shown in FIG. 14(b) may respectively indicate the antenna port indexes.

The above-mentioned scheme in which the above E-REGs are grouped by a predetermined rule and the antenna port indexes of the start point for each E-REG group are differently established has the following advantages. If the use of some REs is limited by the presence of reference signals (CSI-RS, CRS, etc.), the order of the antenna port indexes started from E-REG is regularized through grouping, asymmetrical characteristics in the number of REs per antenna port can be mitigated. In this case, the E-REG grouping method or the method for allocating start antenna port indexes to respective E-REG groups may be statically decided irrespective of RS configuration or the presence or absence of other control channels, or may be dynamically changed through higher layer signaling.

Meanwhile, not only in the case where 16 E-REGs are present in one PRB pair and 4 E-REGs construct one ECCE, but also in the case where the size of E-REG is changed and/or the number of E-REGs constructing one ECCE is changed, E-REGs contained in the PRB pair can be classified into one group starting from the antenna port index #7 and the other group starting from the antenna port index #9. In this case, indexes of the E-REGs contained in each group may be configured differently from the above-mentioned exemplary indexes.

In another example, E-REG needed for antenna port index allocation may be an OFDM symbol. For example, one E-REG for use in a normal subframe may be composed of 12 REs, and 14 E-REGs may be defined in one subframe.

In addition, if reference signals (such as CRS and CSI-RS) are present and a control channel such as PDCCH is transmitted along with E-PDCCH so that it is impossible to use some REs, or/and if some symbols cannot be used in DwPTS according to special subframe configuration in a TDD system, antenna ports may be alternately allocated only to available REs contained in each E-REG.

Figure 15:
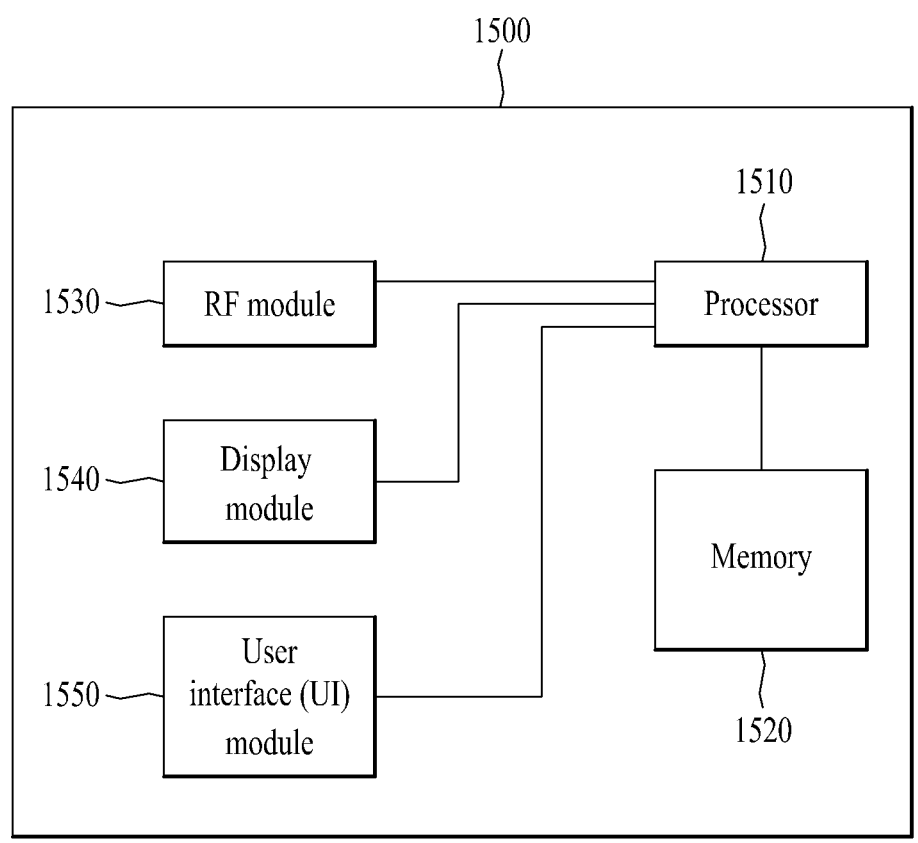
FIG. 15 is a block diagram illustrating a communication device according to an embodiment of the present invention.

FIG. 15 is a block diagram for an example of a communication device according to one embodiment of the present invention.

Referring to FIG. 15, a communication device 1500 may include a processor 1510, a memory 1520, an RF module 1530, a display module 1540, and a user interface module 1550.

Since the communication device 1500 is depicted for clarity of description, prescribed module(s) may be omitted in part. The communication device 1500 may further include necessary module(s). And, a prescribed module of the communication device 1500 may be divided into subdivided modules. A processor 1510 is configured to perform an operation according to the embodiments of the present invention illustrated with reference to drawings. In particular, the detailed operation of the processor 1510 may refer to the former contents described with reference to FIG. 1 to FIG. 14.

The memory 1520 is connected with the processor 1510 and stores an operating system, applications, program codes, data, and the like. The RF module 1530 is connected with the processor 1510 and then performs a function of converting a baseband signal to a radio signal or a function of converting a radio signal to a baseband signal. To this end, the RF module 1530 performs an analog conversion, amplification, a filtering, and a frequency up conversion, or performs processes inverse to the former processes. The display module 1540 is connected with the processor 1510 and displays various kinds of informations. And, the display module 1540 can be implemented using such a well-known component as an LCD (liquid crystal display), an LED (light emitting diode), an OLED (organic light emitting diode) display and the like, by which the present invention may be non-limited. The user interface module 1550 is connected with the processor 1510 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although the method and apparatus for acquiring a diversity gain according to distributed resource allocation for a downlink control channel in a wireless communication system according to embodiments of the present invention have been disclosed on the basis of the 3GPP LTE mobile communication system, the embodiments can also be applied to various wireless communication systems.

The invention claimed is:

1. A method for transmitting a downlink control channel to a user equipment (UE) by a base station (BS) in a wireless communication system, the method comprising:
    composing each of resource elements (REs) contained in each of resource blocks (RBs) into a plurality of RE groups each having a predetermined number of REs;
    allocating antenna ports to each of the REs by allocating antenna port indexes, cyclically increased or reduced within a predetermined range, to the RBs contained in each of the plurality of RE groups;
    allocating the plurality of RE groups in each of the RBs to transmission (Tx) resources for the downlink control channel;
    mapping the plurality of RE groups into a plurality of RE group sets according to a predetermined condition; and
    transmitting the downlink control channel to the UE using the Tx resources,
    wherein indexes of RE groups included in each of the plurality of RE group sets are allocated differently from each other, and
    wherein starting antenna port indexes of each of the plurality of RE group sets are different from each other.

2. The method according to claim 1, wherein the antenna port indexes allocated to respective start resource elements contained in each RE group are cyclically increased or reduced according to indexes of the RE groups.

3. The method according to claim 1, wherein indexes of RE groups allocated to the Tx resources are cyclically increased or reduced according to indexes of the RBs.

4. The method according to claim 1, wherein if the plurality of RE groups allocated to the Tx resources is constructed in the same RB, the indexes of the plurality of RE groups are contiguous to each other.

5. The method according to claim 1, wherein the number of REs contained in the respective RE groups is a constant number.

6. The method according to claim 1, wherein the number of REs contained in the respective RE groups is changed according to a reference signal contained in a subframe through which the downlink control channel is transmitted and categories of other downlink control channels.

7. A base station (BS) device for use in a wireless communication system, the BS device comprising:
    a processor configured to:
        compose each of resource elements (REs) contained in each of resource blocks (RBs) into a plurality of RE groups each having a predetermined number of REs,
        allocate antenna ports to each of the REs by allocating antenna port indexes, cyclically increased or reduced within a predetermined range, to the RBs contained in each of the plurality of RE groups, and allocate the plurality of RE groups in each of the RBs to transmission (Tx) resources for a downlink control channel, and map the plurality of RE groups into a plurality of RE group sets according to a predetermined condition; and a wireless communication module to transmit the downlink control channel to a user equipment (UE) using the Tx resources, wherein indexes of RE groups included in each of the plurality of RE group sets are allocated differently from each other, and wherein starting antenna port indexes of each of the plurality of RE group sets are different from each other.

8. The BS device according to claim 7, wherein the antenna port indexes allocated to respective start resource elements contained in each RE group are cyclically increased or reduced according to indexes of the RE groups.

9. The BS device according to claim 7, wherein indexes of RE groups allocated to the Tx resources are cyclically increased or reduced according to indexes of the RBs.

10. The BS device according to claim 7, wherein if the plurality of RE groups allocated to the Tx resources is constructed in the same RB, the indexes of the plurality of RE groups are contiguous to each other.

11. The BS device according to claim 7, wherein the number of REs contained in the respective RE groups is a constant number.

12. The BS device according to claim 7, wherein the number of REs contained in the respective RE groups is changed according to a reference signal contained in a subframe through which the downlink control channel is transmitted and categories of other downlink control channels.

* * * * *